United States Patent [19]

Gangal

[11] 4,342,675
[45] Aug. 3, 1982

[54] PROCESS FOR PREPARING AQUEOUS DISPERSION OF POLYTETRAFLUOROETHYLENE

[75] Inventor: Subhash V. Gangal, Parkersburg, W. Va.

[73] Assignee: E. I. Du Pont de Nemours and Company, Wilmington, Del.

[21] Appl. No.: 916,844

[22] Filed: Jun. 16, 1978

[51] Int. Cl.³ .............................................. C08L 23/00
[52] U.S. Cl. .................................. 524/762; 526/81; 526/86; 526/206; 526/255; 524/777; 524/805
[58] Field of Search ...................... 260/29.6 F; 526/81, 526/86, 206, 255

[56] References Cited

U.S. PATENT DOCUMENTS 3,391,099 7/1968 Punderson ...................... 260/29.6 F
3,607,878 9/1971 Grimaud et al. ...................... 526/94
3,654,210 4/1972 Kuhls et al. ...................... 260/29.6 F
3,951,930 4/1976 Downer et al. ...................... 526/86
4,016,345 4/1977 Holmes .............................. 526/255

Primary Examiner—John Kight, III
Assistant Examiner—Amelia B. Yarbrough

[57] ABSTRACT

Polytetrafluoroethylene dispersions obtained from dispersion polymerization which have high solids content and small polytetrafluoroethylene particles are obtained by employing a combination of disuccinic acid peroxide and an inorganic persulfate, and a combination of an anionic and a hydrocarbon dispersing agent, precharged to the polymerization mixture, and by adding a combination of disuccinic acid peroxide and an anionic dispersing agent during the course of the polymerization.

4 Claims, No Drawings

PROCESS FOR PREPARING AQUEOUS DISPERSION OF POLYTETRAFLUOROETHYLENE

TECHNICAL FIELD

This invention relates to an improvement in the aqueous dispersion polymerization of tetrafluoroethylene.

BACKGROUND ART

The polymerization of tetrafluoroethylene in aqueous medium can be carried out by two distinctly different procedures. In one procedure, little or no dispersing agent is employed and agitation is carried out vigorously in order to produce a precipitated resin, commonly referred to as "granular" resin. In the other procedure, sufficient dispersing agent is employed and agitation is mild in order to produce small colloidal size particles dispersed in the aqueous reaction medium. In this second procedure, called aqueous dispersion polymerization, precipitation (i.e., coagulation) of the resin particles is avoided. The two procedures produce distinctly different products. The granular product can be molded in various forms, whereas the resin produced by the aqueous dispersion method cannot be molded but is fabricated by dispersion coating or by converting to powder for paste extrusion with a lubricating medium. In contrast, the granular resin is incapable of being paste extruded or dispersion coated.

In aqueous dispersion polymerization it is desirable to obtain small size colloidal polytetrafluoroethylene particles to achieve good stability against coagulation from the dispersion, to facilitate penetration by the particles of woven interstices when the dispersion is coated on woven fabric, and to attain high extrusion pressures to enhance strength of paste extruded articles.

It is also desirable in aqueous dispersion polymerization to obtain high solids concentration, i.e., a high percent of polymer in the dispersion, because when the amount of polymer formed during the polymerization is increased, the production is increased.

Attempts have been made in the art to increase one or the other of these two desirable features. For example, British Pat. No. 1,246,834 sought to increase solids content by employing certain cispersing agents, while British Pat. No. 1,397,931 obtained fairly high solids content by employing a persulfate or $H_2O_2$ initiator and by adding disuccinic acid peroxide at a certain point in the course of the polymerization. Punderson U.S. Pat. No. 3,391,099 teaches that controlled addition of dispersing agent aids in controlling particle size and solids content. However, as solids content increases, particle size also ordinarily increases, and research has continued toward finding a procedure for producing high solid content while producing small particles.

SUMMARY OF THE INVENTION

The process of this invention produces an aqueous dispersion of polytetrafluoroethylene of high polytetrafluoroethylene content and small polytetrafluoroethylene particle size.

Specifically, this invention is a process for producing an aqueous dispersion of polytetrafluoroethylene which comprises polymerizing tetrafluoroethylene in an aqueous medium in which (a) disuccinic acid peroxide and an inorganic persulfate which is present in a weight ratio of peroxide to persulfate of between about 55:1 and about 10:1 is charged to the aqueous medium prior to initiation of polymerization, sufficient disuccinic acid peroxide being added to result in about 100 to 550 ppm disuccinic acid peroxide in the aqueous medium.

(b) a nonionic hydrocarbon surfactant and substantially non-telogenic anionic surfactant which is present in a weight ratio of hydrocarbon surfactant to anionic surfactant of between about 1:30 and about 1:150 is added to the aqueous medium prior to initiation of polymerization, sufficient hydrocarbon surfactant being added to result in about 10 to 40 ppm hydrocarbon surfactant in the aqueous medium.

(c) after at least about 4% polymer solids has formed based on weight of polymerization mixture and before 20% of polymer solids has formed, a mixture of between about 100 to 350% disuccinic acid peroxide, based on amount of disuccinic acid peroxide employed in part (a), and between about 100 and 300% anionic surfactant based on amount of anionic surfactant employed in part (b), is added to the polymerization medium.

Thus, it is seen that to obtain the high solids content and small polytetrafluoroethylene particle sizes in the process of this invention, specific mixtures of polymerization initiators and dispersing agents are added to the polymerization vessel prior to initiation of reaction, and a combination of initiator and surfactant are added after initiation of the reation.

DESCRIPTION OF THE INVENTION

The general procedure for polymerizing tetrafluoroethylene in aqueous medium to produce colloidal particles of polytetrafluoroethylene is well known in the art. Typically, tetrafluoroethylene is contacted with an aqueous dispersion containing dispersing agent and polymerization initiator. Ordinarily, the tetrafluoroethylene monomer is introduced into the dispersion under pressure. Typical conditions include polymerization temperatures of 60°–120° C.; preferably 70°–100° C.; and pressures of 30–1000 psi (2.1 to 70 kg/cm$^2$), preferably 100–800 psi (7–58 kg/cm$^2$). The polymerization is ordinarily carried out in a gently stirred autoclave.

If desired, a paraffin wax (i.e., a saturated hydrocarbon having more than 12 carbon atoms) that is liquid at the polymerization temperature may be employed as described in Bankoff U.S. Pat. No. 2,612,484 to reduce coagulum formation. Usually, the wax is employed in an amount between 0.1%–12% by weight of water in the aqueous dispersion.

Polymerization is effected by mixing the foregoing described ingredients under the conditions specified above in the absence of oxygen. Mixing is ordinarily carried out by mildly agitating the aqueous polymerization mixture. Agitation is controlled to aid in preventing premature coagulation of resin particles produced in the polymerization. Polymerization is ordinarily conducted until the desired solids level (i.e., polymer content) of the aqueous mixture is reached. In this invention solid levels as high as 60% based on total weight of aqueous polymerization mixture can be obtained.

Prior to beginning polymerization an initiator mixture of disuccinic acid peroxide and an inorganic persulfate is added to the polymerization vessel. Examples of inorganic persulfates include ammonium persulfate or alkali metal persulfates such as potassium persulfate and the like. Preferably the inorganic persulfate is ammonium persulfate. The amount of disuccinic acid peroxide employed in the mixture is an amount sufficient to result in a concentration of between about 100 and 550 ppm, preferably between about 250 and 400 ppm, in the aqueous polymerization mixture. The amount of inorganic persulfate present is an amount sufficient to result in a weight ratio of peroxide to persulfate of between about 55:1 and about 10:1 and preferably between about 30:1 and 12:1.

In addition, prior to beginning polymerization, a mixture of dispersing agents is added to aqueous polymerization mix. The mixture of dispersing agents employed is a mixture of a nonionic hydrocarbon surfactant and an anionic surfactant. The amount of nonionic hydrocarbon surfactant employed depends on the amount of initiator present since the surfactant tends to act as a telogen. Generally, this amount is sufficient to result in a concentration of between about 10 and 40 ppm, in the aqueous polymerization mix. The amount of anionic surfactant present is an amount sufficient to result in a weight ratio of hydrocarbon surfactant to anionic surfactant of between about 1:30 and 1:150, and preferably between about 1:50 and 1:100.

The anionic dispersing agent is a substantially non-telogenic dispersing agent. Anionic dispersing agents employed herein include fluorinated carboxylates containing 7–20 carbon atoms, such as ammonium polyfluorocarboxylates. Preferably, the anionic dispersing agent as ammonium perfluorocaprylate.

The hydrocarbon dispersing agent can be the reaction products of ethylene oxide, which imparts a hydrophilic moiety to the surfactant, with other compounds which impart hydrophobic moieties to the surfactant, such as propylene oxide, amines saturated and unsaturated aliphatic alcohols and aliphatic acids, and alkyl phenols. Preferably the hydrocarbon surfactant is an octyl phenol polyethoxy alcohol such as "Triton" X-100.

After at least about 4% polymer solids has formed based on weight of aqueous polymerization mixture, but before about 20% polymer solids has formed, disuccinic acid peroxide and anionic surfactant is added usually mixed together, to the polymerization mixture. The amount of peroxide added is between about 100 and 350% preferably 160 and 300%, based on weight of the amount previously added, and the amount of anionic surfactant added is between about 100 and 300%, preferably between 150 and 250%, based on weight, of the amount previously added. Preferably the anionic surfactant is the same surfactant that was previously added.

Upon completion of the polymerization, the aqueous polymerization mixture is discharged and cooled. If wax is employed, it is removed.

It is believed that addition of initiator and dispersing agent after polymerization has begun results in additional nucleii formation and thus provides more sites for additional polymerization. This apparently results in small size particles and higher solids content.

The polymerization procedure employed herein results in aqueous polymerization mixtures having solids contents of up to 60% by weight, and usually between 40 and 60%; in which the polymer particles are of a small size, for example, 0.165 micron or less. The combination of small particle size and high solids content results in an aqueous mixture which has better stability against settling out of particles than a mixture having larger size particles, which provides better penetration by the particles of woven fabrics coated with the aqueous mixture, and which provides a precipitated resin having a higher extrusion pressure than a corresponding resin having larger size particles. The aqueous mixture can be employed directly to coat fabrics to impart a coating of polytetrafluoroethylene to the fabric, or can be employed to obtain precipitated resin which can be paste extruded in well known applications.

Solid content can be determined by measuring the density of the aqueous mixture and calculating the solids content or by determining the content gravimetrically.

The average particle diameters (RDPS) are determined by a relationship based on light-scattering theory, from the percentage of incident light transmitted at 546 millimicron wavelength through a unit measure of a dilute dispersion (ca. 0.02 weight percent solids), using a nominal value of 0.018 cc/gram for the refractive index increment, $\Delta n/\Delta c$, of said dispersion at 25° C. These values are in theory nearly equal to the weight-average particle diameter, as confirmed by ultra-centrifuge analysis, and are further in reasonable agreement with those determined directly by examination of electron micrographs of the particles at 20,000 diameters magnification.

SSG is a means of determining the molecular weight of polytetrafluoroethylene. The molecular weight of polytetrafluoroethylene resins is so high, i.e., greater than one million, that it is usually measured indirectly by a procedure which gives the standard specific gravity (SSG) of the resin. Standard specific gravity is determined by the procedure described in U.S. Pat. No. 3,142,665 except that 12 gram, instead of 3.5 g, void-free chips of the same diameter were employed. The standard specific gravity of the resin varies inversely with the molecular weight; as the molecular weight increases, the numerical value of the standard specific gravity decreases.

BEST MODE

In the Examples which follow, the polymerization procedure generally employed is described as follows:

A horizontally disposed, water/steam jacketed, cylindrical stainless-steel autoclave located in a barricade and having a capacity of 36,240 cc and a length-to-diameter ratio of about 1.5 to 1, and provided with a 4-bladed cage-type agitator rotated at 46 rpm and running the length of the autoclave, was evacuated and then charged with 855 grams of paraffin wax, 18.61 kg of demineralized water, 25 grams of ammonium perfluorocaprylate (C-8 APFC) dispersing agent, and 0.4 ml of "Triton" X-100 (22.9 ppm). The autoclave was then heated to 88° C., evacuated and purged with tetrafluoroethylene, after which 0.3 g ammonium persulfate (16.1 ppm) initiator (APS) and 5 g disuccinic acid peroxide dissolved in about 100 ml water were added (This resulted in about 300 ppm of peroxide in the mixture). The autoclave was pressured over a period of about 2 minutes to 25.6 kg/cm$^2$ absolute with tetrafluoroethylene (TFE). Stirring rate and temperature were maintained until polymerization started as evidenced by 0.7 kg/cm$^2$ drop in pressure. The temperature was immediately raised to 90° C. where it was maintained throughout the polymerization. Additional TFE was then added to maintain the reaction pressure at 26.3 kg/cm$^2$ until a dispersion of approximately 4 percent solids content (total polymer plus aqueous medium basis) was obtained. After about 1200 grams of TFE had been fed following start of the reaction (4.4 percent solids had formed), 1000 ml of 4.0 percent by weight aqueous solution of C-8 APFC dispersing agent containing 11 g disuccinic acid peroxide was injected into the autoclave. The TFE feed to the autoclave was terminated after 18.61 k grams of TFE was fed, and the pressure was allowed to decrease to 12.3 kg/cm² before agitation was stopped and the vapor space of the reactor was vented. The polymerization time from startup to the time feed was turned off was 91 minutes.

The resulting dispersion was discharged from the autoclave and cooled, after which the supernatant solid paraffin wax was removed.

EXAMPLE 1

Following the polymerization procedure described above, a dispersion containing polytetrafluoroethylene was obtained. The particle size of the PTFE was 0.145µ average. Polymerization data and property data are set forth in the Table below.

EXAMPLE 2

Tetrafluoroethylene was polymerized using the polymerization procedure of Example 1, except the amount of C-8 APFC precharge was reduced and the reaction time was lengthened as shown in the Table below. The dispersion obtained contained about 49.4 solids and the particle size was 0.155µ on average. Polymerization data and property data are set forth in the Table below.

EXAMPLE 3

Tetrafluoroethylene was polymerized following the procedure in Example 1 except that changes in concentration and reaction were made as shown in the Table below. The dispersion obtained contained 55.2% PTFE solids and the particle size of the PTFE was 0.150µ. Property data are also listed in the Table.

COMPARISON A

Tetrafluoroethylene was polymerized to 50% dispersion solids content following the general teaching of Canada Pat. No. 590,392. Ammonium persulfate initiator and the same amount of total anionic dispersing agent, as used in Example 1 were precharged. Reaction conditions are shown in the Table below. The dispersion obtained contained about 50% PTFE solids, but the particle size of this PTFE was large (0.202µ).

COMPARISON B

Tetrafluoroethylene was polymerized to 50% solids containing dispersion using the teaching of British Pat. No. 1,397,931. Ammonium persulfate initiator and the same amount of anionic dispersing agent as used in Example 1 were precharged and disuccinic acid peroxide was added during polymerization. Amounts of ingredients and reaction conditions are shown in the Table below. The dispersion contained about 50% PTFE solids, but the particle size of the PTFE was large (0.207µ).

COMPARISON C

Tetrafluoroethylene was polymerized to 50% solids following the teaching of British Pat. No. 1,246,834, i.e., ammonium persulfate initiator, an anionic dispersing agent and a nonionic hydrocarbon dispersing agent were precharged. The dispersion obtained contained 50.3% solids and the particle size of the PTFE was 0.176µ.

Comparisons A, B and C show that the TFE polymerized to high solids dispersion content having a small (less than 0.165µ) particle size cannot be produced by the procedures employed therein.

HIGH SOLIDS SMALL PARTICLE DISPERSION

| EX. | "Triton"* Solution ml | Initiator DSP ppm | DSP Pre-charge g | APS ppm | DSP Pump g | APS Pre-charge g | C-8 APFC Pre-charge g | Pump g | TFE kg/ Water kg | Press psi | Rx-Time min | Temp °C. | Solids | SSG | RDPS µ |
|---|---|---|---|---|---|---|---|---|---|---|---|---|---|---|---|
| 1 | 4 | 22.9 | 5 | 268.7 | 11 | 0.3 | 25 | 40 | 18.61/18.61 | 350 | 91 | 90 | 49.4 | 2.225 | 0.145 |
| A | 0 | 0 | 0 | — | 0 | 0.5 | 65 | 0 | 18.61/18.61 | 360 | 47 | 90 | 50.0 | 2.198 | 0.202 |
| B | 0 | 0 | 0 | — | 12 | 0.3 | 65 | 0 | 18.61/18.61 | 360 | 56 | 90 | 49.4 | 2.184 | 0.207 |
| C | 4 | 22.9 | 0 | — | 0 | 0.5 | 65 | 0 | 18.61/18.61 | 360 | 47 | 90 | 50.3 | 2.204 | 0.176 |
| 2 | 4 | 22.9 | 5 | 268.7 | 11 | 0.3 | 20 | 40 | 18.61/18.61 | 350 | 120 | 90 | 49.4 | 2.213 | 0.155 |
| 3 | 3 | 17.2 | 5 | 268.7 | 12 | 0.6 | 25 | 50 | 20.1/15.9 | 350 | 57 | 90 | 55.2 | 2.249 | 0.150 |

*"Triton" Solution = 10% Aqueous Solution
**Pump means added after about 4.4% solids content had formed.

I claim:

1. A process for producing an aqueous dispersion of polytetrafluoroethylene which comprises polymerizing tetrafluoroethylene in an aqueous medium at a temperature of between about 60° C. and 120° C. and at a pressure of between about 30 and 1000 psi (2.1 to 70 kg/cm²), in which
   (a) disuccinic acid peroxide and an inorganic persulfate present in a weight ratio of peroxide to persulfate of between about 55:1 and about 10:1 is charged to the aqueous medium prior to initiation of polymerization, sufficient disuccinic acid peroxide being added to result in about 100 to 550 ppm disuccinic acid peroxide in the aqueous medium;
   (b) a nonionic hydrocarbon surfactant and substantially nontelogenic anionic surfactant which is present in a weight ratio of hydrocarbon surfactant to anionic surfactant of between about 1:30 and about 1:150 is added to the aqueous medium prior to initiation of polymerization, sufficient hydrocarbon surfactant being added to result in about 10 to 40 ppm hydrocarbon surfactant in the aqueous medium; and
   (c) after at least about 4% polymer solids has formed based on weight of polymerization mixture and before 20% of polymer solids has formed, a mixture of between about 100 to 350% disuccinic acid peroxide based on the amount of disuccinic acid peroxide employed in part (a), and between about 100 and 300% anionic surfactant based on the amount of anionic surfactant employed in part (b), is added to the polymerization medium.

2. Process of claim 1 wherein in part (a) the inorganic persulfate is ammonium persulfate; in part (b) the nonionic hydrocarbon surfactant is an octyl phenol polyethoxy alcohol, and the anionic surfactant is ammonium perfluorocaprylate; and in part (c) the anionic surfactant is ammonium perfluorocaprylate.

3. Process of claim 2 wherein, in part (a) the weight ratio of peroxide to persulfate is between about 30:1 and 12:1; and in part (b) the weight ratio of hydrocarbon surfactant to anionic surfactant is between about 1:50 and 1:100.

4. Process of claim 1 wherein, in part (a) the amount of disuccinic acid peroxide in the aqueous medium is between 250 and 400 ppm; and in part (c) the amount of disuccinic acid peroxide in the mixture added in part (c) is between about 160 and 300% based on the amount of disuccinic acid peroxide employed in part (a), and the amount of anionic surfactant in the mixture added in part (c) is between about 150 and 250% based on the amount of anionic surfactant previously added.

* * * * *